US008886462B1

(12) United States Patent
Cioffi et al.

(10) Patent No.: US 8,886,462 B1
(45) Date of Patent: Nov. 11, 2014

(54) SYSTEMS, METHODS, AND SOFTWARE FOR PROVIDING WAYFINDING ORIENTATION AND WAYFINDING DATA TO BLIND TRAVELERS

(71) Applicant: InTouch Graphics, Inc., St. Paul, MN (US)

(72) Inventors: Joseph Cioffi, St. Paul, MN (US); Philip Agee, New York, NY (US)

(73) Assignee: InTouch Graphics, Inc., St. Paul, MN (US)

( * ) Notice: Subject to any disclaimer, the term of this patent is extended or adjusted under 35 U.S.C. 154(b) by 0 days.

(21) Appl. No.: 14/088,817

(22) Filed: Nov. 25, 2013

Related U.S. Application Data

(63) Continuation of application No. 12/727,206, filed on Mar. 18, 2010, now Pat. No. 8,594,935.

(60) Provisional application No. 61/161,356, filed on Mar. 18, 2009.

(51) Int. Cl.
*G01C 21/34* (2006.01)
*G01C 21/36* (2006.01)
*A61H 3/06* (2006.01)

(52) U.S. Cl.
CPC ............ *G01C 21/3629* (2013.01); *A61H 3/061* (2013.01); *A61H 2201/5048* (2013.01)
USPC ........................................................ 701/533

(58) Field of Classification Search
CPC ............................ G01C 21/32; G01C 21/3446
USPC ......................................................... 701/533
See application file for complete search history.

(56) References Cited

U.S. PATENT DOCUMENTS 6,502,032 B1   12/2002   Newman
6,711,474 B1   3/2004    Treyz et al.
(Continued)

FOREIGN PATENT DOCUMENTS

JP   2008-11172 A     5/2005
WO   2010/108047 A2   9/2010
WO   2010/108047 A3   9/2010

OTHER PUBLICATIONS

Invitation to Pay Additional Fees and, Where Applicable, Protest Fee issued in corresponding International application No. PCT/US2010/027881, date of mailing Jul. 20, 2010.

(Continued)

*Primary Examiner* — James Trammell
*Assistant Examiner* — Michael D Lang
(74) *Attorney, Agent, or Firm* — Patent Portfolio Builders PLLC

(57) ABSTRACT

To support the independence and mobility of blind pedestrians, the present inventors devised, among other things, free systems, methods, and software for providing narrative blind-ready wayfinding information. One exemplary system receives user input identifying a starting landmark and ending landmark in a particular selected geographic region, such as a city, university campus, government building, shopping mall, or airport. The system then searches a database for the corresponding narrative wayfinding instructions, and outputs them in the form of text or audio to guide a blind pedestrian from the starting landmark to the ending landmark. In the exemplary system, blind users select the geographic region as well as the starting and ending landmark from a voice-driven telephonic menu system and receive audible wayfinding instruction via mobile telephone, in some embodiments, the system also provides access to voice-driven restaurant menus.

21 Claims, 4 Drawing Sheets

(56) References Cited

U.S. PATENT DOCUMENTS

| | | |
|---|---|---|
| 8,594,935 B2 | 11/2013 | Cioffi et al. |
| 2004/0155815 A1 | 8/2004 | Muncaster et al. |
| 2006/0293839 A1* | 12/2006 | Stankieiwcz et al. ......... 701/200 |
| 2008/0102858 A1 | 5/2008 | Giniger et al. |
| 2008/0120029 A1 | 5/2008 | Zelek et al. |
| 2009/0032590 A1 | 2/2009 | Hopkins |
| 2009/0157302 A1 | 6/2009 | Tashev et al. |
| 2009/0191514 A1 | 7/2009 | Barnow |
| 2009/0240428 A1 | 9/2009 | Shahrestani |
| 2010/0049431 A1 | 2/2010 | Zetune |
| 2010/0241350 A1 | 9/2010 | Cioffi et al. |

OTHER PUBLICATIONS

International Search Report issued in corresponding International application No. PCT/US2010/027881, date of mailing Nov. 12, 2010.

Written Opinion of the International Searching Authority issued in corresponding International application No. PCT/US2010/027881, date of mailing Nov. 12, 2010.

International Preliminary Report on Patentability issued in corresponding International application No. PCT/US2010/027881, date of issuance Sep. 20, 2011.

* cited by examiner

SYSTEMS, METHODS, AND SOFTWARE FOR PROVIDING WAYFINDING ORIENTATION AND WAYFINDING DATA TO BLIND TRAVELERS

RELATED APPLICATION

The present application claims priority to U.S. Provisional Patent Application 61/161,356, which was filed on Mar. 18, 2009. This application is incorporated herein by reference.

COPYRIGHT NOTICE AND LIMITED PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2009, InTouch Graphics, Inc.

TECHNICAL FIELD

Various embodiments of the present invention concern systems and methods for providing wayfinding information to blind and visually impaired pedestrians.

BACKGROUND

Blind pedestrians use a variety of travel aids, Chief among these are white canes and guide dogs. However, recent years have seen the emergence of navigational aid systems based on newer technologies, such as radio-frequency identification (REID) tags and the Global Positioning System (GPS).

Although these high-tech systems provide some benefits, the present inventors have recognized that they suffer from disadvantages that have prevented widespread adoption. For example, these devices typically require purchase of specialized hardware, such as RFID readers, that is beyond the means of many in the blind and visually impaired community. Additionally, the street-based routing information provided by these systems is set up for users with normal vision and therefore of minimal to no value to blind and visually impaired travelers.

Accordingly, the present inventors have recognized a need for better ways of providing routing information to blind and visually impaired pedestrians.

SUMMARY

To address this and/or other needs, the present inventors devised, among other things, systems, methods, and software for providing narrative wayfinding information to blind and visually impaired pedestrians. One exemplary system provides a database of preconfigured narrative wayfinding data suitable for blind navigation. The system receives user input identifying a starting landmark and ending landmark in a particular geographic region, searches the database for the corresponding narrative wayfinding data, and then outputs the wayfinding information, in the form of text or audio, for guiding a blind pedestrian from the starting landmark to the ending landmark. In the exemplary system, blind users select the geographic region as well as the starting and ending landmark from a voice-driven telephonic menu system, accessible via a mobile telephone, personal digital assistant, or computer. In some embodiments, the system also provides indoor wayfinding data to help blind users walk from an entry point of a landmark building or facility to one or more offices, retail shops, offices, automatic teller machines, elevators, restrooms, or other points of interest within facility. Still other embodiments provide options for the user to access voice-driven food menus for restaurants or other types of menus, such as government service menus within a facility.

Additionally, the exemplary system is provided as a free service to all users with an internee connection, telephone, or cell phone. Facility and building owners provide financial support for the system.

DETAILED DESCRIPTION OF THE EXEMPLARY EMBODIMENT(S)

Figure 1:
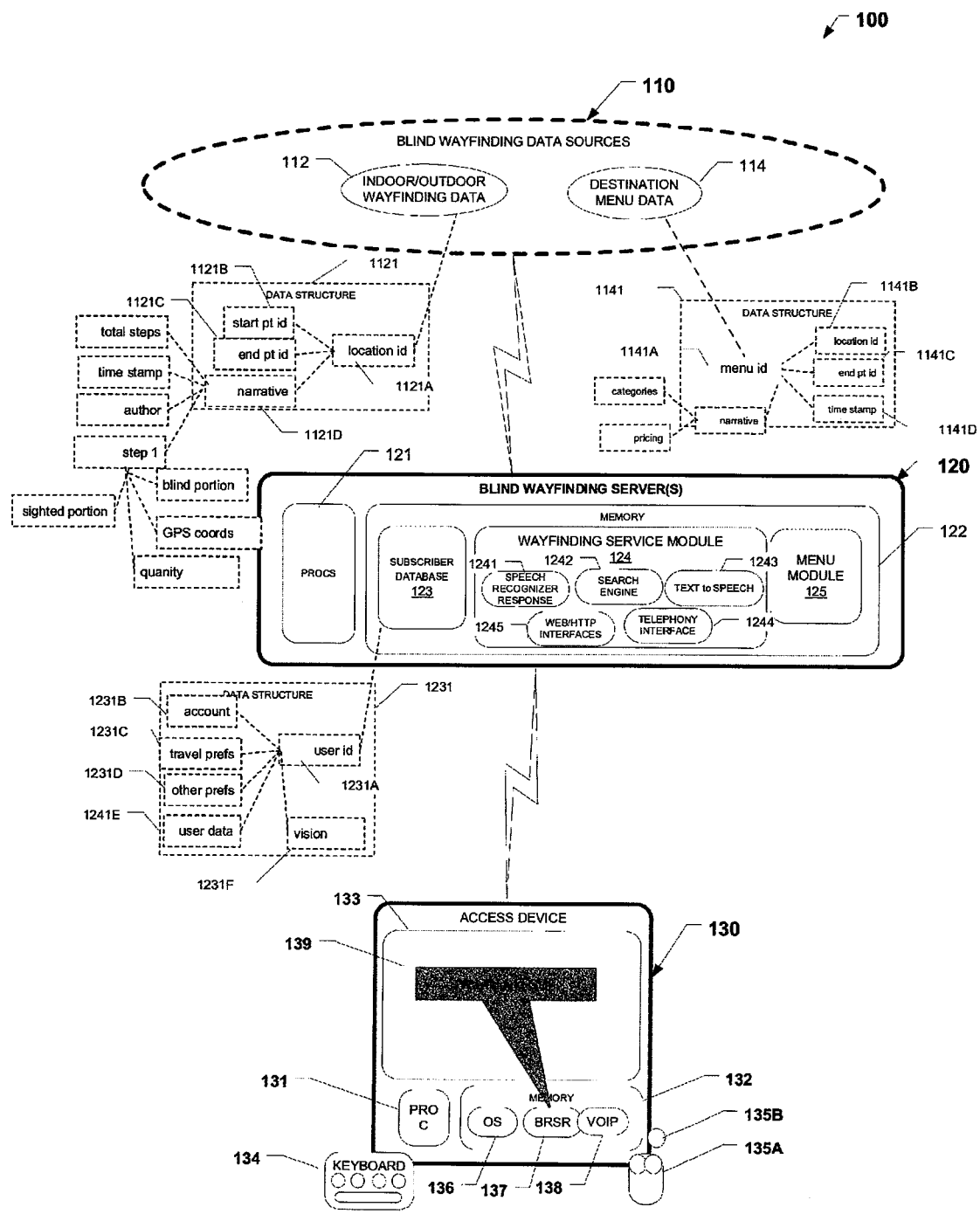
FIG. 1 is a block diagram of an exemplary blind pedestrian wayfinding system corresponding to one or more embodiments of the present invention.

This document, which incorporates the drawings and the appended claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

EXEMPLARY DEFINITIONS

As an aid to understanding the following description, the following exemplary definitions are provided:

Orientation and mobility refers to a body of knowledge and the specific techniques within the "blindness education" domain that involve skills needed for a blind traveler to develop an awareness of the environment, and the ability to travel through it safely and independently.

Cognitive map: refers to the mental processing involved in acquiring, storing, and retrieving information having to do with one's physical or spatial environment.

"constant contact technique" refers to method of using a long (white) cane technique whereby the cane tip makes continuous contact with the walking surface as it moves rhythmically side-to-side over in a distance slightly greater than the physical body width of the individual. This technique is used to guarantee that a blind traveler will detect any changes of elevation in the walking path.

Wayfinding—refers to the navigational methods used by an individual to travel from one location to another. With respect to "blindness wayfinding", it refers to the specific landmarking and safety techniques that a blind individual needs in order to accomplish this kind of deliberate navigation safely and independently.

Landmarks and landmarking (as they relate to wayfinding for the blind): A landmark is an object that has an auditory, olfactory, proprioceptive or tactile quality and that has a known permanent location in an environment. A landmark must be constant and permanent to qualify as a useful orientation aid for a blind traveler. Once these landmarks are identified and brought to the attention of a blind traveler, they can be used: to establish and maintain directional orientation; as a reference point to establish distance relationships in locating a specific object, to orient or reorient oneself to an area, to determine parallel or perpendicular alignment for straight line travel.

Narrative map (also referred to as verbal, text-based, or auditory maps): A narrative map is a verbal or text-based description that assists someone in developing a mental representation of a particular environment, or provides the step-by-step instructions required to follow and maintain orientation along a walking route.

Trailing: Involves the use of one's fingers, a cane, or some residual vision, to follow a surface or guideline along a walking route. Exemplary surfaces include walls, grassline edges, driveways, curbs, etc.

Tactile map: an image that uses raised surfaces and textures that represent an indoor or outdoor environment and that assist in the development of a spatial map. Tactile maps can be designed with both Braille and print features.

Exemplary Blind Wayfinding Data System

FIG. 1 shows an exemplary blind wayfinding data system 100. System 100 includes blind wayfinding databases 110, a blind wayfinding data servers 120, and access devices 130.

Exemplary Blind Wayfinding Data Sources

Blind wayfinding data sources 110 include an indoor-outdoor blind wayfinding database 112, and a destination menu database 114. Indoor-outdoor blind wayfinding database 112 includes indoor-outdoor blind wayfinding route data in the form of narrative walking routes between two outdoor points or landmarks (such as intersections, buildings, facilities) or between two indoor points or facility features, such as entry doors, offices, elevators, restrooms. In some embodiments, routes can encompass both indoor and outdoor landmarks or features. Database 112, which for example takes the form of a SQL database, includes one or more narrative maps.

In the exemplary embodiment, each narrative map takes the form of a set of one or more textual and/or audio instructions, and is prepared by blind mobility specialists, incorporating terminology, technique recommendations, and landmarking cues that work for blind travelers. An exemplary 6-step narrative map is provided in the table below,

| Route: Coffman Memorial Hall to Moos Tower: |
|---|
| 1. Exit main front doors of Coffman Memorial Hall. You are facing North in the direction of Washington Ave, This is a 10-foot wide pathway with grass edges on both left and right sides as you walk in a perpendicular direction towards Washington Ave. Proceed straight until you reach the Washington Ave sidewalk in 30 feet. |
| 2. Turn right at this intersecting sidewalk, now facing East on Washington Ave. Continue straight and in 50 feet you will reach the first down curb at the T-intersection of Church and Washington. |
| 3. This is a light controlled T-intersection with 2-way traffic. Cross straight and continue along Washington Ave. |
| 4. At mid-block, while following the right side edge of this sidewalk (there is a curb guideline along this right edge), the sidewalk increases significantly in width, from 10 feet to 30 feet. This is at the 200-foot marker of this block. |

| Route: Coffman Memorial Hall to Moos Tower: |
|---|
| 5. Walk straight for another 20 feet and make a right turn, now facing South. Continue straight until you reach ascending stairs. Take these 10 steps to the top landing, and walk straight 20 feet until you find the perpendicular wall of a building, |
| 6. This is Moos Tower. Turn left and here and trail until you feel the double door entrance in 20 feet. |

Narrative map data is stored in tables in a relational database, which are generally representative of narrative map data structures, of which data structure 1121 is generally representative. Data structure 1121 includes a location identifier 1121A, a starting point identifier 1121B, an end or destination point identifier 1121C, and narrative text instructions 1121D. Location identifier 1121A uniquely identifies a geographic region or facility, such as University of Minnesota, which is associated with starting point identifier 1121B and ending point identifiers 1121C. (It is assumed in the exemplary embodiment that pedestrians will be traveling within a single location or region; however, other embodiments may provide for starting point and ending points that are in separate zones by, for example, allowing a starting or ending point to be associated with more than one location identifier) Narrative text instructions 1121D is itself logically associated with a total steps indicator for indicating the number of steps in the instructional sequence, a time stamp indicator for indicating the last time the narrative instructions were updated, an author indicator for indicating the author(s) of the narrative instruction, as well as one or more narrative step instructions, such as step 1. Portions of each instructions are further associated with tags or corresponding fields to identify portions of instructions that are intended to support blind pedestrians.

Additionally, one or more portions of each step instruction are associated with a GPS coordinates to facilitate use of other data and functions that may be correlated to such coordinates. For example, this allows synchronized output of the instruction as text, Braille, or audio based on real-time measured or estimated position of the user. However, other embodiments allow the user to advance, pause, or backup to replay presentation of a narrative map using a voice or manually input command.

Some embodiments support GPS interfacing. This enables users having mobile phones or other devices with GPS or analogous capability to user such GPS data as an input to the wayfinding system. For example, if a user is positioned at a landmark correlated to current positional coordinates, the system can receive a generic command such as "from here, how do get to the library," and have the system be able to correlate based on GPS or cell phone tower location data or Wife location data to the appropriate set of directions, with appropriate user confirmation input or preference data to resolve any ambiguities. In some instances, the positional data can be used to negate or defeat presentation of certain menu options.

In some embodiments, the narrative maps are converted by a multimedia encoding system into multimedia files using encoding servers as part of the textual data entry process for the narrative maps. The encoding system creates multi-media files of the step-by-step directions and other location information using codecs MPEG (mp3), Adobe Flash (flv), Microsoft Windows Media (wmv), and Apple Quicktime (mov).

Destination menu database 114 stores one or more textual restaurant (or more generally government or business service) menus. The menus are stored in the form of one or more data structures, of which menu data structure 1141 is generally representative. Data structure 1141 includes a menu identifier field 1141A, a location identifier 1141B for associating the menu with a particular geographic region, an end point identifier 1141C for associating the menu with a particular endpoint or destination within the geographic region, and a time stamp identifier for indicating when the menu was last updated. Additionally, the data structure includes a menu narrative field 1141E including the text of one of more items, such as food or beverage items. Each listed item is associated with one or more category tags, such as entrée, soup, salad, beverage, wheat, eggs, (other known allergens), and as well as pricing data tags. In the exemplary embodiment these allow for sorting and eliminating menu items from presentation to a given user based on stored dietary and price preferences. (Some embodiments also store the narrative menus as audio files, or in association with a preferred text-to-speech synthesizer for the restaurant or business associated with the menu.) Data sources 110 are coupled or couplable via a wireless or wireline communications network, to wayfinding server 120.

Exemplary Wayfinding Server

Wayfinding data server 120, which provides blind wayfinding and menu data to blind and visually impaired pedestrian users, includes a processor module 121, a memory module 122, a subscriber database module 123, a wayfinding service module 124, and a menu module 125.

Processor module 121 includes one or more local or distributed processors, controllers, or virtual machines. In the exemplary embodiment, processor module 121 assumes any convenient or desirable form. In some embodiments, one or more of the processors are incorporated into servers.

Memory module 122, which takes the exemplary form of one or more electronic, magnetic, or optical data-storage devices, stores machine-readable instructions that when executed by one or more processors, performs one or more of the processes and/or methods as described herein.

In the exemplary embodiment, subscriber module 123 includes one or more sets of machine-readable and/or executable instructions for collecting and storing user account or subscriber data for blind users. (Some embodiments also include sighted or non-blind users.) To this end, module includes one or more data structures, of which subscriber data structure 1231 is representative. Data structure 123 includes a unique identification portion 1231A, which is logically associated with one or more fields, such as fields 1231B, 1231C, 1231D, 1231E, and 1231F. Field 1231B includes a user account data, such as username and passwords, contact data (such as mobile telephone number and email address), and credit card billing information; field 1231C includes travel preference information, such as preferred locations (geographic regions), starting points or landmarks, and ending points or destinations. Field 1231D includes other preferences, such as dietary preferences, price preferences, user allergens, and so forth. Field 1231E includes user generated or private narrative map information, which are not generally available to other users. Field 1231F includes a vision status field, which designates the user as sighted or blind, and enables the system to filter out or leave in blind portions of narrative map data.

In some embodiments, wayfinding service module 124 includes one or more sets of machine-readable and/or executable instructions for receiving user requests for wayfinding data, searching databases 110, and outputting wayfinding data (narrative maps) to an access device. In particular wayfinding service module 124 includes a speech recognizer 1241, a search engine 1242, a text-to-speech converter 1243, a telephony module 1244, and a web/http interface module 1245. Speech recognizer/responder 1241 receives voice commands and requests from users, for example locations, starting points, and destinations and provides query structures to search engine 124. Search engine 124 communicates the requests to databases 112, receives the results in textual form, for example, and forward them to text-to-speech module 1243 for conversion and output to telephony module 1244 for communication with an access device having a telephone capability. Exemplary telephony capabilities include Voice-Over-Internet-Protocol (VOIP) and automated voice response systems. Web interface module 1245 provides web interface functionality and related graphical user interfaces for receives and fulfilling requests via an HTTP protocol. Text-based and graphical interfaces including web pages consisting of HTML, AJAX, Javascript, CSS over HTTP, Web interface module 1245 also supports entering and displaying narrative map data using HTML forms. Hyperlinks on web pages provide access to multimedia files for downloading, podcasts, RSS text feeds, and RSS audio feeds. Web pages also provide access to streaming of multimedia map data.

Menu module 125 includes one or more sets of machine-readable and/or executable instructions for receiving user requests for destination menu data, searching databases 110 (specifically destination menu data 114), and outputting menu data to an access device, as discussed herein, based on user preferences. Additionally, in some embodiments, menu module 125 includes instructions for playing back selected menu options, calculating purchases, and conducting secure credit card transactions based on user selected menu options.

Server 120 interacts via a wireless or wireline communications network with one or more accesses devices, such as access device 130.

Exemplary Access Device

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display/loudspeaker 133, a keypad or board 134, and user input devices 135, such as graphical pointer or selector 135A and microphone 135B.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements), as shown for example in FIGS. 3 and 4 and further described below. (The exemplary embodiment defines one or more portions of interface 138 using applets or other programmatic objects or structures from server 120 to implement the interfaces shown or described elsewhere in this description.)

Exemplary Method(s) of Operation

Figure 2:
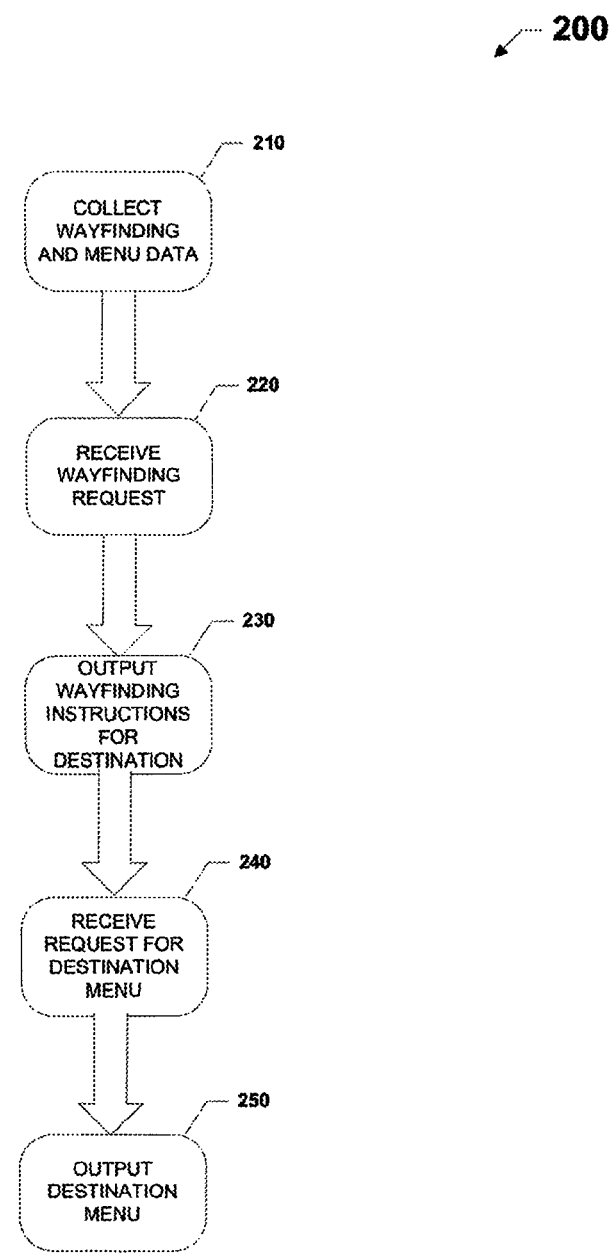
FIG. 2 is a flow chart of an exemplary method of operating a blind pedestrian way finding system, corresponding to one or more embodiments of the present invention.

FIG. 2 shows a flow chart 200 of one or more exemplary methods of operating a system, such as system 100. Flow chart 200 includes blocks 210-299, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with collecting and organizing narrative map and restaurant menu data. In the exemplary embodiment, this entails expert collection and drafting of narrative map data for various locations. The narrative map data is uploaded as text into the database. In some embodiments, various portions of the narrative map data is tagged to facilitate use, pursuant to data structure 1121. For example, the particular map itself is tagged with starting and ending landmarks, a time stamp, author, total number of steps. Each step is also separately tagged or labeled with a sequence number. Moreover, some embodiments label or tag portions of the text within each step to indicate for example that the tagged portion is a distance quantity or that the tagged portion is a blind wayfinding instruction or description. This latter tag facilitates filtering of the narrative map for use by a sighted person. The exemplary embodiment also collects textual menu data and structures it according data structure 1141. Exemplary execution continues at block 220.

Figure 3:
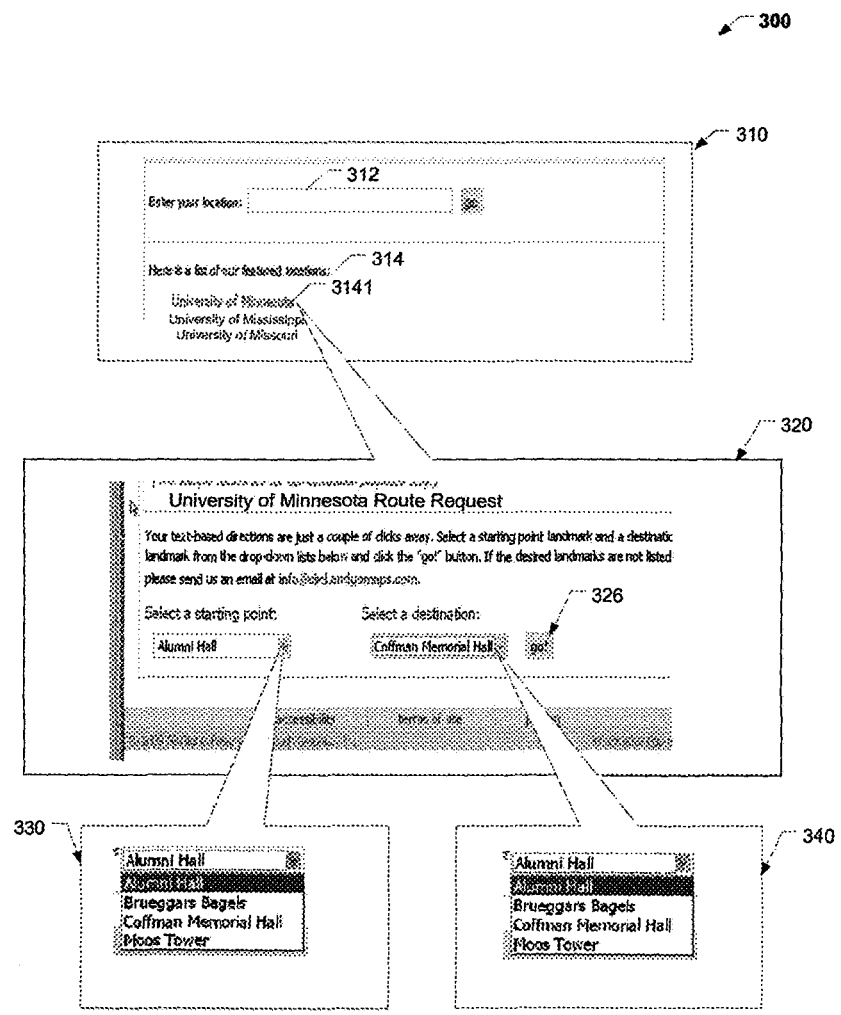
FIG. 3 is a facsimile of an exemplary graphical user interface 300, which corresponds to one or more embodiments of the present invention.

Block 220 entails receiving a wayfinding request from a blind pedestrian user. In the exemplary embodiment, this entails user making a selection from either a graphical user interface or via voice command menu, using a mobile telephone or personal digital assistant or personal computer. In the case of a graphical user interface, the exemplary embodiment uses interfaces as shown in FIG. 3. These interfaces guide a user to select or identify a location, such as city, state, university, airport, shopping mall other defined geographic region, or to o initiate a search of database for relevant blind-ready walking map data. Or, alternatively user selects from a drop down menu or list of predefined or dynamically determined locations. In some embodiments, the list and menus are presented after a user login, which allows the lists and menus to be based on stored user preference information, such as a stored set of favorite or most recently used locations or regions. Additionally, some embodiments are responsive to current location information, for example, from a Global Positioning System (GPS), to determine which of a set of available lists and menu options are appropriate for presentation to a user, reducing the number of selections for a user to consider or eliminating the need for a user to make a selection at all. This screen also includes a "change page for low vision" command feature to adjust the size of the text display and/or enable voice output as the user scrolls over the selection features on the page.

After selection of University of Minnesota from map region definition page, User selects a starting point, landmark. In some embodiments, the starting point is selected automatically based on current user position, which can be determined using positional information in the client access device associated with the user, for example, mobile telephone with WiFi or GPS positional capability. In some embodiments, this starting point, is taken automatically to be the last user selected destination. Again, it may also be selected automatically based on stored user preference information.

User then selects a destination from the drop down menu and selects go to initiate a search of database for the blind-ready map data to travel (e.g. walk) from the starting point to the destination. (Some embodiments provide wheel-chair or impaired walker accessible travel directions which direct users to ramps, railings, and other walking surfaces that are designed for use by wheel-chair or other disabled travelers. Some embodiments also allow users to look for other travel features, such as restrooms, family, restrooms, diaper changing stations.

In some embodiments, the selections shown here on a graphical user interface, are presented as audio to the user via telephone and voice-activated technologies. Also, some embodiments allow output of the directions in audio form for selected playback on a mobile client device, as MP3 or podcast. In some embodiments, the playback of the audio directions is synched to real-time positional information from a GPS system or to n command signal, such as next given verbally or via a keypad or other manual entry from the user.

Figure 4:
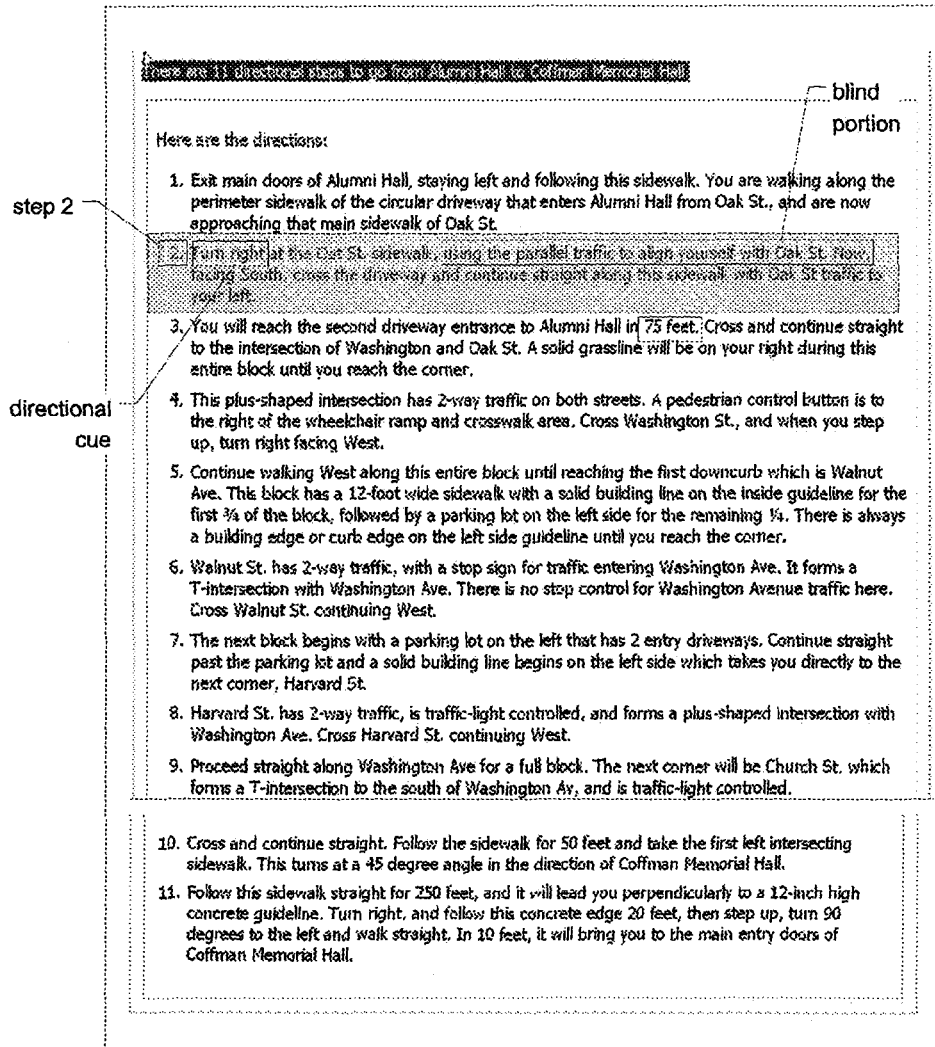
FIG. 4 is a facsimile of an exemplary graphical user interface 400, which corresponds to one or more embodiments of the present invention.

Block 230 entails outputting wayfinding instructions (blind ready wayfinding instructions to an access device carried or used by a blind pedestrian. In the exemplary embodiment the output is provided as audio output via a telephony interface or as textual output via a web interface. FIG. 4 show an exemplary web interface displaying textual representation of blind-ready wayfinding instructions.

Block 240 entails receiving a request for a menu associated with a given landmark or destination, in the exemplary embodiment, the destination is by default the destination associated with the most recently fulfilled wayfinding data request. However, in other embodiments, the menu is associated with UPS coordinates and the system uses the user's current UPS or similar positional information to determine the most likely menus.

In block 250, the system output a destination menu to the user in audio and/or text form. In some embodiments, the menu is output based on user preferences, such as dietary and/or price preferences to reduce data transfer demands and improve useability of complex menu options. Additionally some embodiments receive voice commands to filter and sort menu options. Some embodiments also allow users to eliminate items or reserve items as maybes as they are played out. This enables the user to rapidly converge on desired selections and ultimately make decisions, and/or place orders via the system.

APPENDIX

Sample Narrative Maps

Route

Alumni Hall to Coffman Memorial Hall

1. Exit main doors of Alumni Hall, staying left and following this sidewalk. You are walking along the perimeter sidewalk of the circular driveway that enters Alumni Hall from Oak St., and are now approaching that main sidewalk of Oak St.
2. Turn right at the Oat St. sidewalk, using the parallel traffic to align yourself with Oak St. Now, facing South, cross the driveway and continue straight along this sidewalk with Oak St traffic to your left.
3. You will reach the second driveway entrance to Alumni Hall in 75 feet. Cross and continue straight to the intersection of Washington and Oak St. A solid grassline will be on your right during this entire block until you reach the corner.
4. This plus-shaped intersection has 2-way traffic on both streets. A pedestrian control button is to the right of the wheelchair ramp and crosswalk area. Cross Washington St., and when you step up, turn right facing West.
5. This block has a 12 foot wide sidewalk with a solid building line on the inside guideline for the first ¾ of the block, followed by a parking lot on the left side for the remaining ¼. There is always a building edge or curb edge on the left side guideline until you reach the corner.
6. Walnut St. has 2-way traffic, with a stop sign for traffic entering Washington Ave. It forms a T-intersection with Washington Ave. There is no stop control for Washington Avenue traffic here. Cross Walnut St. continuing West.
7. The next block begins with a parking lot on the left that has 2 entry driveways. Continue straight past the parking lot and a solid building line begins on the left side which takes you directly to the next corner, Harvard St.
8. Harvard St. has 2-way traffic, is traffic-light controlled, and forms a plus-shaped intersection with Washington Ave. Cross Harvard St. continuing West.
9. Proceed straight along Washington Ave for a full block. The next corner will be Church St. which forms a T-intersection to the south of Washington Av, and is traffic-light controlled.
10. Cross and continue straight. Follow the sidewalk for 50 feet and take the first left intersecting sidewalk. This turns at a 45 degree angle in the direction of Coffman Memorial Union.
11. Follow this sidewalk straight for 250 feet, and it will lead you perpendicularly to a 12-inch high concrete guideline. Turn right, and follow this concrete edge 20 feet, then step up, turn 90 degrees to the left and walk straight. In 10 feet, it will bring you to the main entry doors of Coffman Memorial Hall.

Route

Brueggars Bagels to Alumni Hall

1. Exit the main front door of Brueggars Bagels. This exit doorway is diagonally oriented towards the intersection of Washington Ave and Oak St.
2. With your back to these doors, the corner of the intersection is 10 feet ahead. Walk in the direction of 10 o'clock, find the curb and align yourself to cross Washington Ave. You are now facing North.
3. This plus-shaped, light-controlled intersection has 2-way traffic on both streets. A pedestrian control button is to the left of the wheelchair ramp and crosswalk area. Cross Washington St., continuing North, and in 20 feet, you will find a grass-line on the left side edge. This edge continues without a break for approximately 400 feet. The first noticeable change underfoot is a slight slope down as you approach an entry driveway leading towards the Alumni Hall building.
4. Cross this 20-foot driveway and continue straight. A grass-line resumes on the left. In another 50 feet, the second section of this circular driveway appears. Cross this 20 foot driveway and turn left, now following the right side grass-line of this entry sidewalk.
5. This right-side grass line changes in 50 feet to concrete, and 50 feet after that it reaches the main entry doorway to Alumni Hall. Four sets of double doors are found at this main entrance. Enter these doors and you will be in the main lobby. Elevators are to your right, following the direction of the floor carpet, in 150 feet.

Route

Moos Tower to Brueggars Bagels

1. Exit main front doors of Moos Tower facing Washington Ave. You are facing North. Moos Tower is located on the South side of Washington Ave, between Church St and Harvard St.
2. Carefully walk straight out of these doors, using constant contact technique (if a cane traveler). You are now approaching a long edge of perpendicular steps, about 25 feet away. Descend these stairs (one flight of 10 steps), and when you reach the lower landing, you will be on the main level of the Washington Ave sidewalk, but 30 feet from the curb.
3. Walk straight to the curb, turn right and proceed parallel to Washington Ave. You are now walking East. This part of the block has a large building on the right side which forms the last long guideline before reaching Harvard St,
4. Harvard St has 2-way traffic, is traffic light controlled, and forms a plus intersection with Washington Ave. Cross Harvard St continuing East. The next block begins with a solid building line begins on the right, and ends with a parking lot and 2 entry driveways. Continue straight to the next corner, Walnut St,
5. Walnut St. has 2-way traffic, a stop sign for traffic entering Washington Ave, and forms a T-intersection with Washington Ave. There is no stop control for Washington Avenue traffic here. Cross Walnut St. continuing East.
6. Continue East along this entire block until reaching the first downcurb which is Oak St. This block has a 12 foot wide sidewalk with a parking lot on the right side for the first ¼ distance and a solid building line on the inside guideline for the last ¾ distance of the block. There is always a building edge or curb edge on the right side guideline until you reach the corner.
7. Facing East at the corner of Oak St. and Washington Ave, Brueggars Bagels is immediately behind you and at 4 o'clock, 10 feet away. Enter through 2 sets of doors, and the main counter is at 2:00, 30 feet away.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A blind traveler navigational data system having a server, the server s comprising:
 means for receiving information identifying first and second landmarks from a set of predefined landmarks within a predefined geographic region;
 means, responsive to the identified first and second landmarks, for accessing and retrieving from a database, blind-ready wayfinding instructions for guiding a blind or visually impaired traveler from the first identified landmark to the second identified landmark; and
 means for outputting the retrieved blind-ready wayfinding instructions to a blind or visually impaired user,
 wherein the blind-ready wayfinding instructions includes walking path surface information for facilitating trailing.

2. The system of claim 1, wherein the means for identifying two of a set of landmarks includes means for receiving a selection of at least one of the first and second landmarks via a telephone-operated voice-response system.

3. The system of claim 1, wherein the means for receiving information identifying first and second landmarks includes a graphical user interface at least partially defined by the server.

4. The system of claim 1, wherein the second landmark is a building, and wherein the server further comprises means, responsive to a user command, for outputting a listing of indoor destination options associated with the second identified landmark; and means, responsive to selection of one of the indoor destination options, for accessing and retrieving from a database, blind ready wayfinding data for guiding a blind or visually impaired (legally blind) traveler from an entry door of the building to the selected one of the indoor destination options.

5. The system of claim 4, wherein the one of indoor destination option is a business that leases space within the building.

6. The system of claim 4, wherein the one of the indoor destination options is an automatic teller machine in the building.

7. The system of claim 4, wherein the one of the indoor destination options is a restroom within the building.

8. The system of claim 4, wherein the one of the indoor destination options is a wheelchair ramp within the building.

9. The system of claim 4, wherein the one of the indoor destination options is a tactile map within the building.

10. The system of claim 4, wherein the one of the indoor destination options is an elevator within the building.

11. The system of claim 4, wherein the one of the indoor destination options is an escalator within the building.

12. The system of claim 4, wherein the one of the indoor destination options is a water fountain within the building.

13. The system of claim 4, wherein the one of the indoor destination options is an restaurant within the building, and the server further includes means, responsive to a user command, for presenting at least a portion of a voice navigable voice menu of food items for the restaurant.

14. The system of claim 13, wherein the server further includes:
 means, responsive to a user voice command, for receiving one or more menu selections;
 means responsive to a subsequent user voice command for playing back the one or more menu selections; and
 means responsive a subsequent user voice command for communicating an order based on the one or more menu selections to an order management system within the restaurant.

15. The system of claim 13, wherein the server further includes means, responsive to a user command, for eliminating one or more menu items from presentation during an access session.

16. The system of claim 15, wherein the means for eliminating is configured to receive an elimination command from a user during a presentation of a first portion of the voice menu, and during a subsequent presentation of the voice menu for the user (during the session) the first portion is not presented.

17. The system of claim 13, wherein the server includes dietary (preference data for a user and means, responsive to stored dietary preference data for the user, for inhibiting playback of one or more portions of a voice navigable voice menu.

18. A method implemented using at least one processor and memory, the method comprising:
 receiving into the memory information identifying first and second landmarks from a set of predefined landmarks within a predefined geographic region;
 in response to the identified first and second landmarks, using the processor to access and retrieve from a database, blind-ready wayfinding instructions for guiding a blind or visually impaired traveler from the first identified landmark to the second identified landmark; and
 outputting the retrieved blind-ready wayfinding instructions to wireless device carried by a blind or visually impaired user,
 wherein the blind-ready wayfinding instructions includes walking path surface information for facilitating trailing.

19. The method of claim 18, wherein the wireless device is a mobile telephone and the wayfinding instructions comprise a text-to-speech synthesis of textual wayfinding instructions.

20. A machine-readable data storage medium comprising machine-executable instructions for:
 receiving into memory information identifying first and second landmarks from a set of predefined landmarks within a predefined geographic region;
 in response to the identified first and second landmarks, causing a processor to access and retrieve from a database blind-ready wayfinding instructions for guiding a blind or visually impaired traveler from the first identified landmark to the second identified landmark; and
 causing a device associated with the processor to output the retrieved blind-ready wayfinding Instructions to a wireless device carried by a blind or visually impaired user,
 wherein the blind-ready wayfinding instructions includes walking path surface information for facilitating trailing.

21. The machine-readable data storage medium of claim 20, wherein the wireless device is a mobile telephone and the wayfinding instructions comprise a text-to-speech synthesis of textual wayfinding instructions.

* * * * *